United States Patent [19]

Madni et al.

[11] Patent Number: 5,003,312

[45] Date of Patent: Mar. 26, 1991

[54] VELOCITY DECEPTION APPARATUS AND METHOD THEREFOR

[75] Inventors: Asad M. Madni, Los Angeles; Lawrence A. Wan, Malibu, both of Calif.

[73] Assignee: Systron Donner Corporation, Concord, Calif.

[21] Appl. No.: 855,151

[22] Filed: Mar. 28, 1986

[51] Int. Cl.⁵ ............................................. G01S 7/38
[52] U.S. Cl. ..................................... 342/15; 307/511
[58] Field of Search ......................... 342/15; 307/511

[56] References Cited

U.S. PATENT DOCUMENTS

| | | | |
|---|---|---|---|
| 3,113,268 | 12/1963 | Horak | 342/15 |
| 3,720,952 | 3/1973 | Lawsine | 342/15 |
| 4,017,856 | 4/1977 | Wiegand | 342/15 |
| 4,072,949 | 2/1978 | Van Brunt | 342/15 |
| 4,297,641 | 10/1981 | Sterzer | 342/15 X |
| 4,322,730 | 3/1982 | Chrzanowski | 342/15 |
| 4,338,528 | 7/1982 | Wolkstein | 342/15 X |
| 4,396,917 | 8/1983 | Tucker | 342/15 |
| 4,743,905 | 5/1988 | Wiegand | 342/14 |

Primary Examiner—Gilberto Barrón, Jr.
Attorney, Agent, or Firm—Flehr, Hohbach, Test, Albritton & Herbert

[57] ABSTRACT

The velocity deception apparatus utilizes a serrodyne technique to produce various deception jamming modes. The modes are all controllable by parameters which are digitally stored and in addition, the modes may be selectively actuated by a remote control panel located in the aircraft on which the apparatus is installed. All of the foregoing is accomplished with low cost, reliability, simplicity and with flexibility of operation in being able to digitally reprogram the apparatus on an ongoing basis.

8 Claims, 10 Drawing Sheets

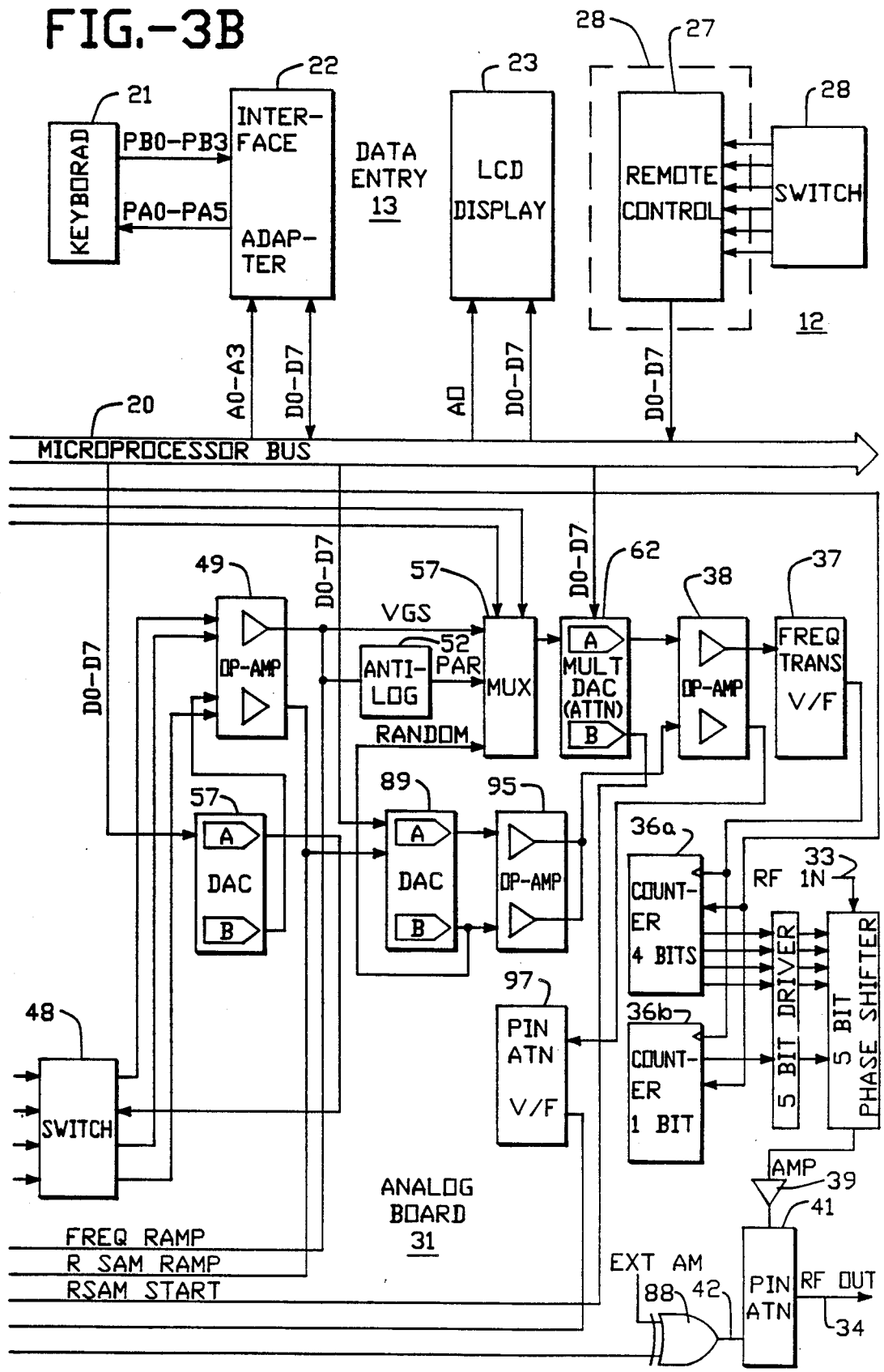

VELOCITY DECEPTION APPARATUS AND METHOD THEREFOR

VELOCITY DECEPTION APPARATUS AND METHOD THEREFOR

The present invention is directed to a velocity deception apparatus and method therefor, and more specifically to a deception jamming apparatus of the type using frequency translation and which is operable in several modes.

Deception jamming is an electronic counter measures (ECM) technique which in its simplest mode produces a slowly changing false Doppler frequency by a so-called velocity gate stealer (VGS). Several modifications of this basic mode are possible and known which basically provide false Doppler velocity information but by different techniques depending on the purpose and application.

One of the essential building blocks of a deception system of the above type is a serrodyne technique utilizing either a traveling wave tube amplifier (TWTA) or a digital solid state phase shifter. Such a phase shifter utilized in conjunction with velocity deception apparatus is disclosed and claimed in co-pending application Ser. No. 534,566 entitled VELOCITY DECEPTION APPARATUS filed Sept. 22, 1983 in the names of Asad M. Madni and Joseph Fala and assigned to the present assignee.

Since velocity deception apparatus of this type is used in aircraft or missiles, it is desired that it be small and light, reliable, and versatile in being able to provide several modes of operation in a simple and controllable manner.

Thus, it is an object of the present invention to provide an improved velocity deception apparatus and method therefor.

OBJECTS AND SUMMARY OF INVENTION

In accordance with the above object, there is provided a velocity deception apparatus for receiving radar signals and frequency translating them comprising variable phase shifter means responsive to a ramp type voltage input for frequency translating the received radar signal. Waveform generator means generate a plurality of different ramp type voltages. Microprocessor means provide at least one digital data input. A multiplying digital-to-analog converter has as a reference input the ramp voltage from said waveform generator, and also has the digital data input whose value scales the ramp. The digital-to-analog converter thus provides a ramp type output voltage which drives the phase shifter. Thus, the digital data input determines the maximum frequency translation.

A method of velocity deception is also provided utilizing the above apparatus which has the capability of operating in several modes. The method includes the step of mounting the velocity deception module in an installation to be protected, digitally storing parameters for a number of modes, and then selecting one of the modes by use of a remote control panel in the installation itself.

DESCRIPTION OF PREFERRED EMBODIMENT

Figure 1:
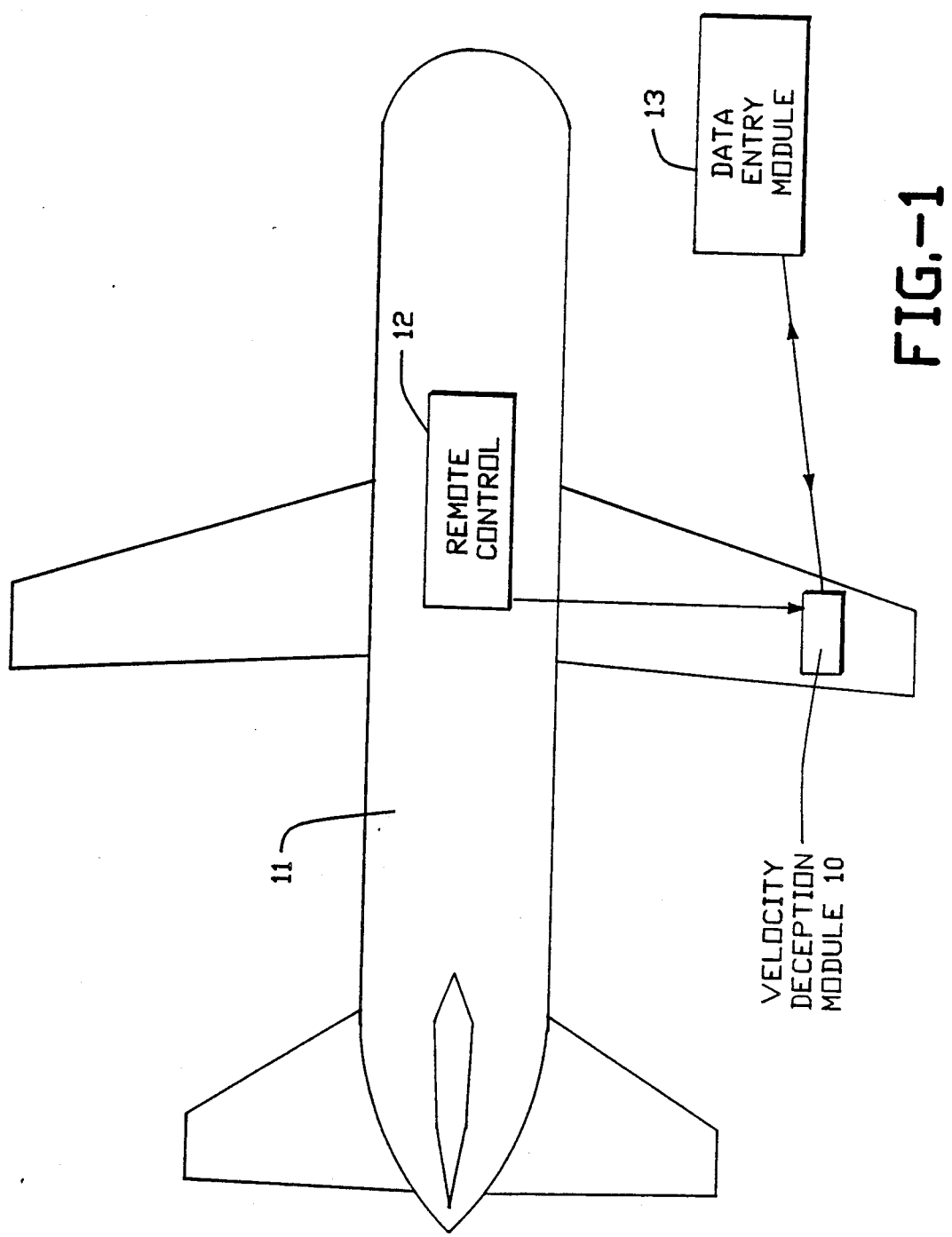
FIG. 1 is a very simplified schematic representation of an aircraft in which the present invention is installed and also illustrating the method of the present invention.

As discussed above, the present invention has the ability to provide a plurality of deception jamming modes. The following is a description of the various deception jamming modes in which the invention is capable of operating.

DESCRIPTION OF DECEPTION JAMMING MODES

Velocity Gate Stealer (VGS). VGS is generated by serrodyning a continuous wave (CW), traveling wave tube amplifier (TWTA) repeater or a digital, solid state, phase shifter to produce slowing changing, false Doppler frequencies. VGS deception is employed against Doppler systems with a speed gate or velocity tracker. VGS pulls the velocity tracker off the target return and drops it. The radar may then lock onto clutter or be forced into a reacquisition sequence.

Random Doppler (RD). RD is generated by serrodyning a CW, TWTA repeater or a digital, solid state, phase shifter with a sawtooth waveform that is randomly varied in frequency. Each of the sawtooth frequencies is held for a period of 20 milliseconds. The sawtooth frequency typically deviates from a minimum of 50 Hz to a maximum that is adjustable from 1 to 50 kHz. The output of the TWTA then contains, in addition to the true target return signal, false signals that are greater in amplitude than that of the target return and are changing in frequency randomly about the target return. This technique introduces false Doppler targets and can cause confusion during the search and acquisition sequence of Doppler radars.

Narrow-band Repeater Noise (NBRN). NBRN is generated by serrodyning a CW, TWTA repeater or a digital phase shifter with a rapidly swept sawtooth waveform. The sawtooth frequency is swept rapidly from about 50 Hz to a maximum that is adjustable from 1 to 30 kHz. While the frequency is being swept, the slope of the sawtooth is alternately switched between positive and negative. This technique causes false signals to appear both above and below that of the target return frequency. Amplitude modulation is also used with the serrodyning to add more lines to the RF spectrum. The result is a relatively even distribution of noise-like power over the selected bandwidth which masks the target return. In a Doppler radar NBRN can severely degrade the target tracking and may even force the radar into passive angle track.

Repeater Swept Amplitude Modulation (RSAM). RSAM is generated by amplitude modulating the repeated radar signal at a frequency which is linearly varied in a sawtooth fashion between preset frequency limits while the duty factor is held constant. The frequency limits of RSAM are set to cover the expected lobing rate of the victim radar. Each time the RSAM frequency corresponds to the lobing frequency, or angle processing rate of the radar, errors are generated in the radar's angle tracking circuitry. RSAM, therefore, degrades or breaks the angle track of radars which have specific lobing frequencies or angle processing rates. It will note degrade angle track of monopulse-type radars.

Combination of VGS and RSAM (VGS). VGS is generated by combining the VGS and RSAM programs discussed above. First, VGS is produced by itself and then, during the latter portion of the VGS program, RSAM is applied. VGS degrades or breaks angle track of non-monopulse type radars. With the velocity tracker pulled off, the angle jamming does not have to compete with the target return. Therefore, VGS is typically more effective than RSAM alone.

Multiple Frequency Repeater (MFR). MFR employs an amplitude modulated, coherent repeater which produces a number of equally spaced signal frequencies each with greater amplitude than that of the target return. MFR introduces errors in the range and range-rate computations of pulse Doppler (PD) radars or introduces false targets into a RP radar while it is in the search mode. MFR can also affect a radar's automatic gain control (AGC) operation and thus degrade its track.

Chirp Gate Stealer (CGS). CGS is generated in exactly the same manner as VGS except that the maximum deviation of CGS is approximately 20 times that of VGS. The CGS false signal interacts with the intrapulse frequency modulation of radars using a pulse compression mode. The interaction is then translated from a frequency change into a time change by the dispersive delay line in the radar. Thus, the radar interprets the periodic frequency changes of the CGS as periodic range changes. Therefore, CGS pulls the range tracker off the true target return, and then drops it.

Holdout and Hook (HO & H). A modification of VGS where a variable but fixed hold time is inserted between walk and dwell periods.

Pseudo Random Noise (PRN). A random sawtooth frequency drives the frequency translation circuits to produce a smearing effect Referring now to FIG. 1, this illustrates a velocity deception module 10 as it would be installed in an aircraft or missile 11. In other words, this is the installation in which the module is installed. Within the installation, for example, at the pilot's control console, is a remote control unit 12 which allows either the pilot of the aircraft or a remote computer to activate or select the specific deception mode; in other words, one of the modes as listed above.

Since these deception modes have various parameters as will be discussed in detail below, a data entry module 13 is provided with which the various parameters may be stored in non-volatile memory in the velocity deception module 10. This might be done before the module is installed on the aircraft 11 or actually accomplished on the aircraft. Alternatively, as will be shown below, a typical RS232 type coupling may be utilized for entry of these parameters from a computer.

Figure 2:
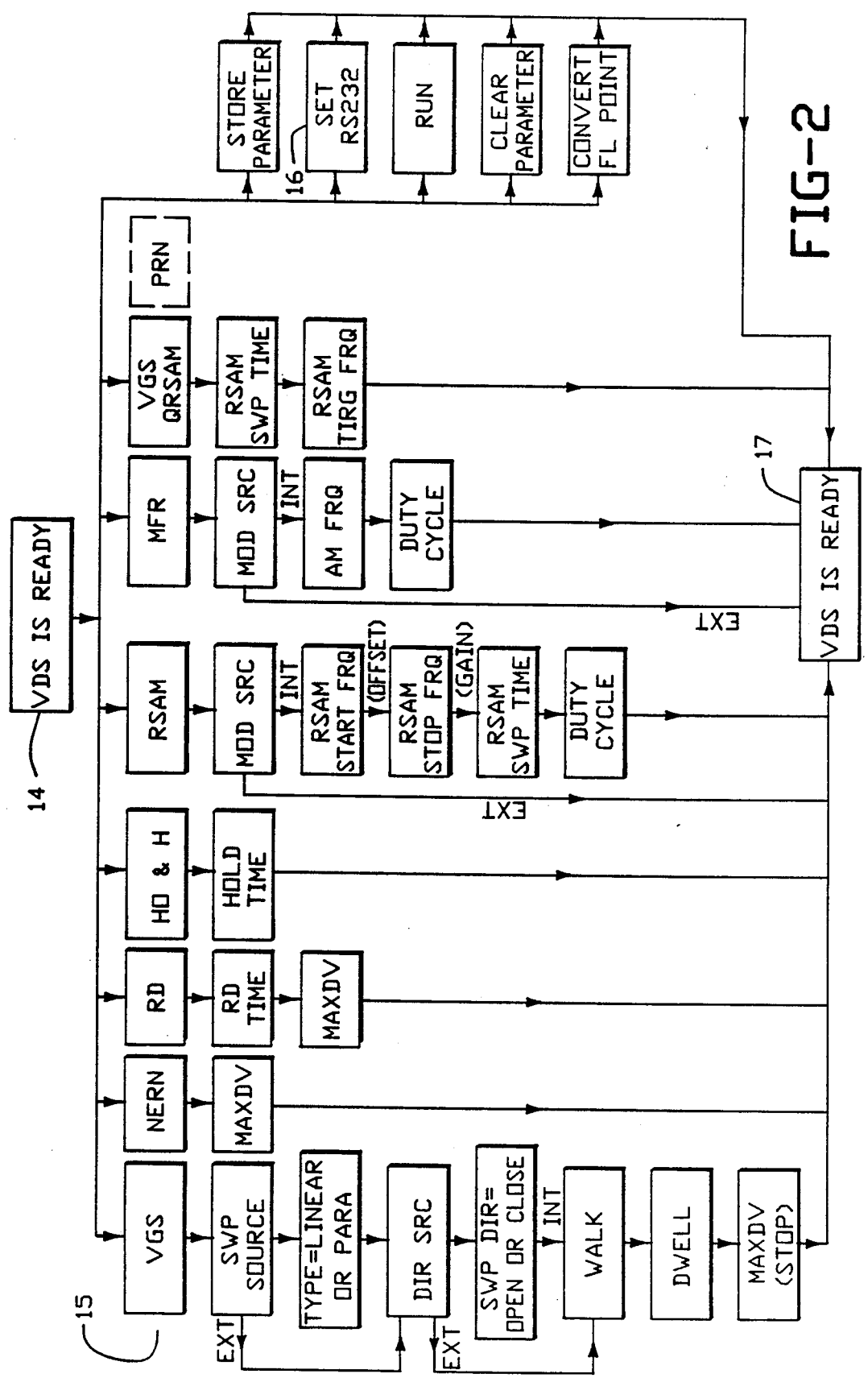
FIG. 2 is a flow chart illustrating the different modes of operation of the present invention and the parameters of operation that are digitally stored in the velocity deception module of the present invention.

FIG. 2 illustrates the flow chart for entering the parameters from the data entry module 13. The VDS IS READY block 14 signifies that the velocity deception system is ready for data entry. Row 15 of functional blocks indicates the various modes with abbreviations as have been defined above. The pseudo random noise (PRN) mode is shown in a dash block since no parameters need be stored for its operation. However, referring briefly to FIG. 1, there would be a switch in remote control unit 12 for activating this mode. Other modes not shown but which are available are merely technical modes such as standby and repeat.

Referring more specifically to the parameter entry flow chart of FIG. 2 with relation to the VGS mode, the first step is designated SWEEP SOURCE where internal or external sweep is utilized. If internal, the type of the sweep may be a linear-type sawtooth ramp or a parabolic ramp. Next the direction is chosen as external or internal and if internal, the sweep direction may be open or closed meaning that the false Doppler echoes deceive the ground radar into believing the target is further away or closer than it actually is. Then the walk and dwell times are set for certain time durations which are respectively the period of the linear ramp or parabolic voltage and the dwell time is the interval between ramps. Finally, the last step is maximum frequency deviation which in essence is the STOP frequency at which point the ramp is retraced to its initial point. The foregoing are more fully explained in the above co-pending Madni/Fala application. This application is incorporated by reference herein.

The next mode, narrow-band repeater noise (NBRN), requires only that the maximum frequency translation be stored.

Random Doppler (RD) requires, as illustrated, random Doppler time and maximum deviation.

Holdout and hook (HO & H) requires the hold time to be stored.

Repeater swept amplitude modulation (RSAM) in the first step requires an external or internal source to be chosen. If internal source, a start frequency, stop frequency, sweep time and duty cycle are chosen.

Multiple frequency repeater (MFR) again requires a choice of external or internal source, an AM frequency selection and a duty cycle selection.

Finally, the combination of VGS and RSAM requires a RSAM sweep time and triggering frequency.

As stated above, all these parameters are entered by a data entry module as illustrated in FIG. 1 or alternatively via the module RS232 computer interface. This is illustrated in block 16. After all the parameters are stored, a VDS IS READY block 17 is reached.

Figure 3A:
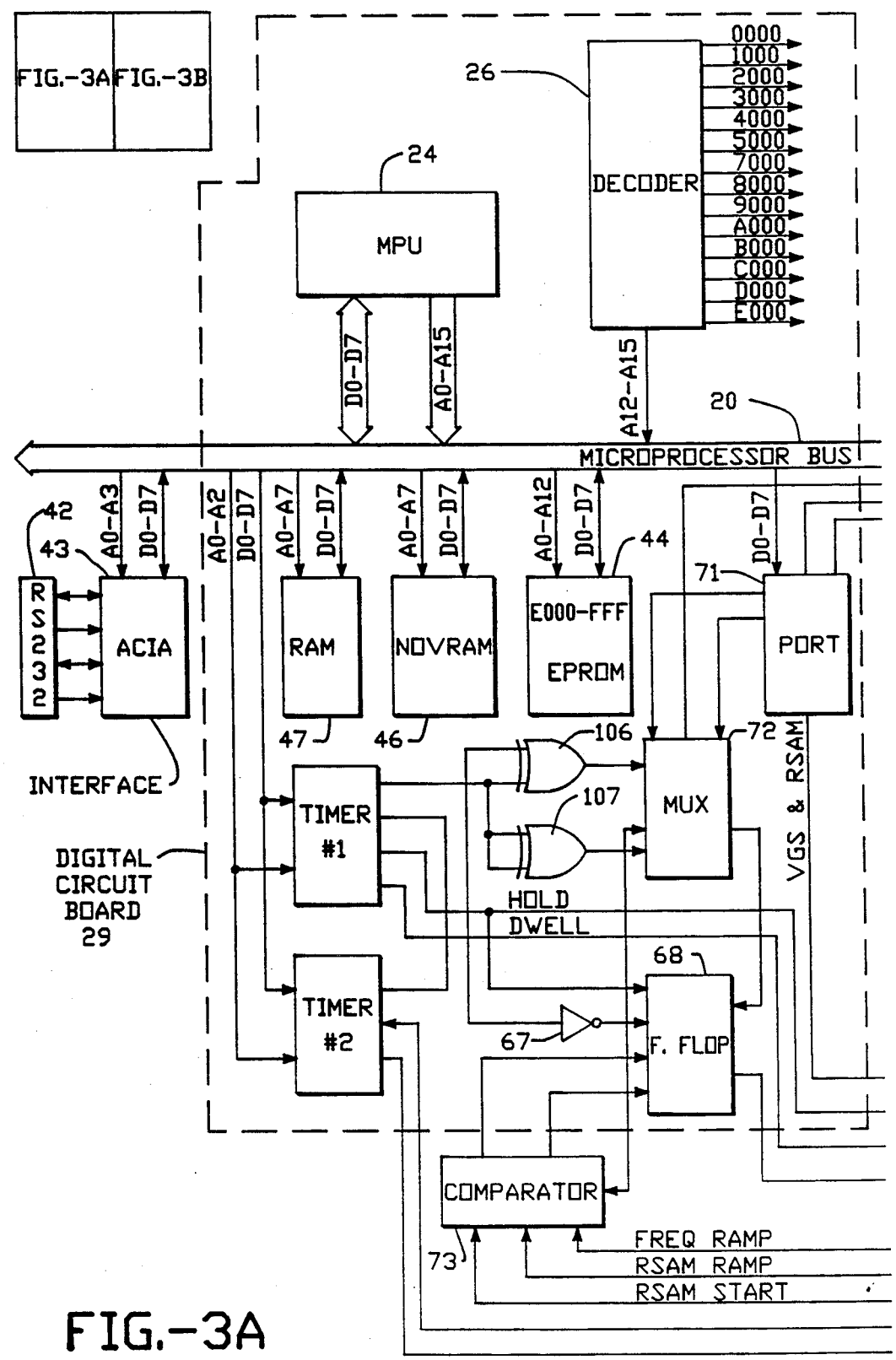
FIG. 3 is a detailed circuit block diagram of the present invention.

FIG. 3 is a simplified block diagram of the velocity deception module 10, remote control unit 12 and data entry module 13. Data entry module 13 is illustrated as a keyboard 21 with an interface adapter 22 and an LCD display 23 all tied into the microprocessor bus 20.

Data entry unit 13 may also include the facility for computer data entry by an RS232 type switch indicated at 42 with an ACIA interface unit 43 coupled to the bus 20 with the same data and address bits as utilized for the interface adapter 22.

The microprocessor 24 is tied into the bus by both data and address lines as illustrated, and a decoder 26 is part of the microprocessor unit to differentiate between the various modes. Remote control unit 12 as indicated is attached to bus 20 and includes a remote control interface unit 27 and a switch unit 28 which in its most simplistic form would be various toggle switches to implement all of the modes as illustrated in row 15 in FIG. 2.

The remainder of the circuit block diagram is thus the velocity deception module 10 which of course also includes the microprocessor unit 24 and its decoder 26. It is conceptually arranged on two circuit boards; one is the digital circuit board 29 illustrated in dashed outline, and the other is an analog circuit board 31 which basically contains the ramp type waveform generators and analog type control units.

As discussed above, the present velocity deception apparatus is workable either with a traveling wave-tube type of phase shifter or a solid state digital phase shifter. The latter is shown and utilized in FIG. 3 and is described in greater detail in the above co-pending Madni/Fala application. Basically it includes a solid state phase shifter 32 which typically might consist of several Shiffman cells for inserting various and different phase shifts into a received radar signal designated on line 33 as RF IN and for ultimately producing a frequency translated or modified radar signal on the line 34 designated as RF OUT.

Phase shifter 32 for each cell has a driver line connected to a 5-bit driver unit 34 which in turn is driven by a 5-bit counter unit 36a, 36b. Counter 36 in turn is driven by a voltage-to-frequency converter 37 which has as an input a ramp type voltage from operational amplifier 38. Typically it is a linear ramp type voltage but could be parabolic, random or any analog type of input. The voltage-to-frequency unit 37 clocks the counter 36 to provide an output train of binary pulses with a repetition rate proportional to the instantaneous voltage magnitudes applied to voltage-to-frequency converter 37. Thus the foregoing circuit provides the frequency translation for the incoming radar signal on line 33 and in a manner as outlined in greater detail in the co-pending application of Madni and Fala.

The output of the phase shifter 32 is amplified at 39 and then is amplitude modulated by a PIN type attenuator 41 which is driven by a digital input 42. The PIN attenuator may consist merely of shunt iterated PIN type diodes which are controlled by a single driver switch. Thirty to 60 dB of attenuation is possible.

Three types of memories are utilized including a typical EPROM unit 44 which contains the operating programs of the system, a non-volatile RAM (NOV-RAM) unit 46 in which the parameters as outlined in FIG. 2 are stored, and a random access memory 47 which is used as a scratch pad for the microprocessor unit 24. The non-volatile RAM 46 is an essential part of this system because it retains data which has been input for a long period of time even when the power to the system is disconnected. Two timers in the digital circuit board portion 29 are designated #1 and #2, and are utilized for generating pulse trains which reflect the data input parameters. For example, timer #1 has, as illustrated, hold and dwell lines which are parameters of the ramp type waveform. These are switched in switch 48 to operational amplifier 49 which, in a manner to be shown in detail below, provides the ramp type function directly to a multiplexer 51 on a line designated VGS or through an anti-log unit 52 provides a parabolic input on the line designated PAR to multiplexer 51. A random analog sweep voltage is also inputted to multiplexer 51.

Since the remaining figures, FIGS. 4–9, show in greater detail portions of the circuit in FIG. 3, these will now be described with reference back to the more simplified diagram of FIG. 3.

Figure 4:
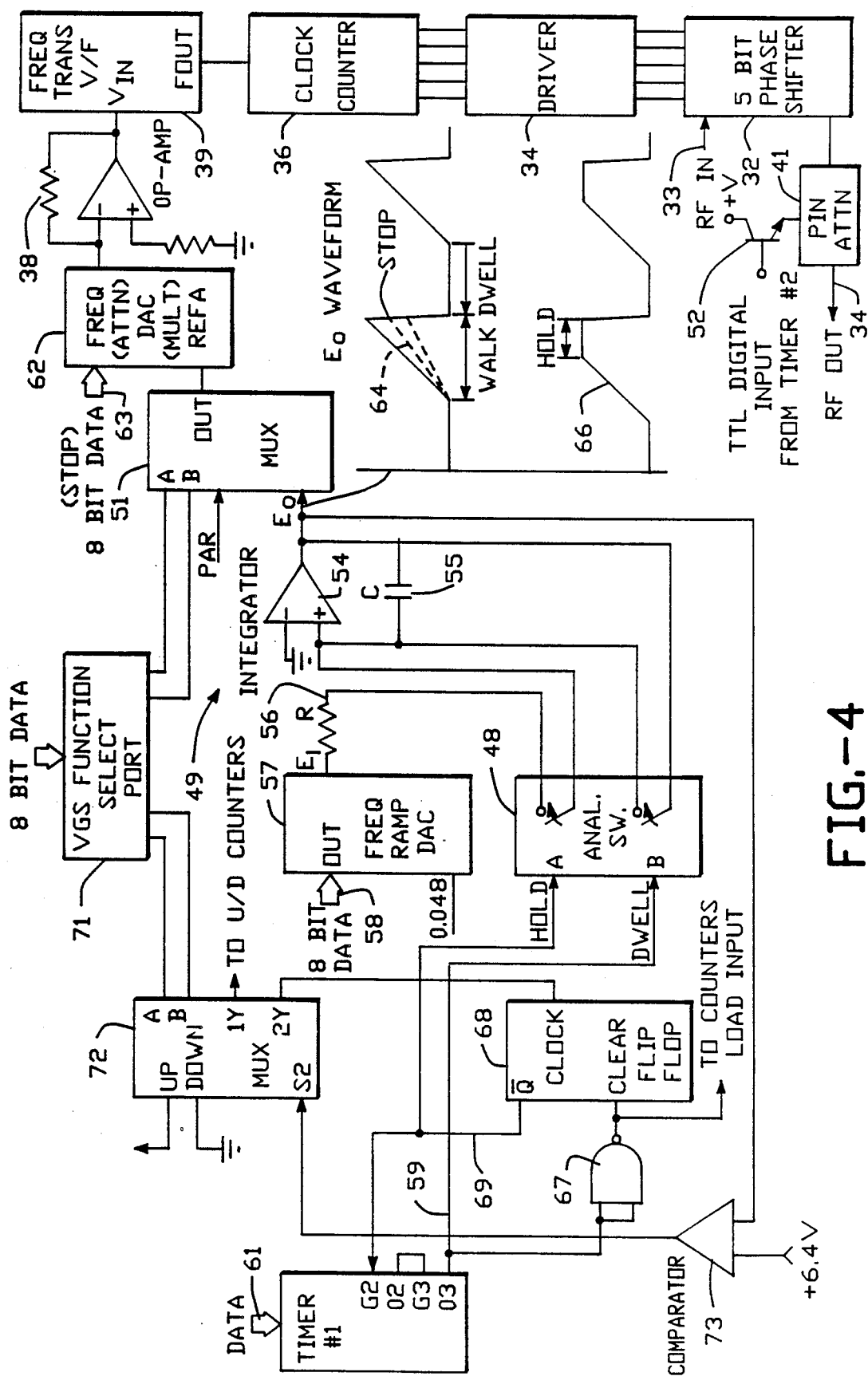
FIG. 4 is a more detailed circuit block diagram of a portion of FIG. 3 illustrating a velocity gate stealing mode and a holdout and hook mode.

Now referring to FIG. 4, variable phase shifter means include the voltage-to-frequency converter 37 which clocks the counter 36 which in turn through drivers 34 drives the various cells of the 5-bit phase shifter 32. As discussed, a PIN attenuator 41 provides the radio frequency output on line 34. PIN attenuator 41 is driven via a simple transistor switch 52 by a TTL digital input from timer #2 as illustrated in FIG. 3.

As discussed in conjunction with FIG. 3, the operational amplifier 49 provides a sawtooth waveform which is designated in the drawing of FIG. 4 as $E_o$ having walk and dwell times as indicated. It serves as an integrating network and includes an amplifier 54 along with the feedback capacitor 55 which is driven by a current source on line 56 consisting of the voltage $E_i$ and the resistor R. This is actually output from the digital-to-analog converter 57. Thus the $E_o$ waveform is generated with walk and dwell times as determined with respect to walk by the current output of DAC 57, which in turn is determined by 8-bit data input on its line 58. Thus this is one of the parameters which has been input as illustrated in the VGS column of FIG. 2, i.e. walk.

Dwell is another parameter which is inputted as digital data from the microprocessor unit to timer #1. Then on its output line 59, a pulse train opens and closes switch B of switch 48 which shorts out capacitor 55 to provide dwell time or the zero voltage level as indicated by the $E_o$ waveform. In general in the VGS functional mode, walk and dwell are adjusted as discussed in the co-pending application. However, this is all done by digital data inputs, that is input 58 which determines the walk period and digital input 61 to timer #1 which determines the dwell period.

One other necessary parameter is the stop time or maximum frequency deviation or translation frequency. This is provided in accordance with the invention by a multiplying digital-to-analog converter 62. It is well known that the output of a digital-to-analog converter is proportional to the product of a digital input value and the reference input. Thus, via the multiplexer 51 the sawtooth $E_o$ waveform is input as reference A. The additional data input in effect imparts a digitally controlled scale factor or effective "gain". Thus the slope of the waveform is varied by the data input at 63 to provide various stop translation frequencies as indicated by the dashed lines 64 on the $E_o$ waveform. Thus digital input 63 determines the maximum frequency translation.

A modification of the VGS mode is the holdout and hook mode which is shown by the waveform 66 which modifies the ramp function at its peak to provide a hold as indicated. This is accomplished by means of the A switch of analog switch 48 opening at the peak of ramp 66 to stop the supply current to the integrator or the capacitor 55 resulting in a steady output voltage. At the end of the hold period, referring to timer #1, the output O2 in going low triggers G3 which starts the dwell time on line 59. This pulse remains high for the programmed dwell. As discussed above, the high pulse on O3 closes switch B of switch 48 to short out the integrating feedback capacitor 55. As this pulse on O3 goes high, the pulse is inverted at 67 to clear the flip/flop 68. Thus the Q output of the flip/flop goes high closing the hold switch. This is on line 68. At this point in time, the waveform is ready to ramp up again at the moment the dwell period ends. Thus, the only difference between the VGS and HO & H modes is the programmed hold time.

Various other circuit components illustrated are a function select port 71 which, for example, in the case of multiplexer 51 selects for example a parabolic ramp type voltage or random voltage. The port 71 is also shown in FIG. 3. Also driven by port 71 is an up/down multiplexer 72 which drives the up/down of clock counters 36 to determine whether the velocity deception is an open or close type. Comparator 73 which has a reference input 6.4 volts provides a maximum frequency translation voltage or other words, determines the peak at which the voltage $E_o$ ramps up to. When the ramp reaches the maximum, the comparator creates a trigger pulse which is sent to multiplexer 72 and thence to the clock input of flip/flop 68. On receiving this clock input pulse, the Q output in going low will trigger the G2 input of the timer #1 and also opens the hold switch A of analog switch 48. It in turn sets off the HOLD timer output 02 for the programmed hold time.

Figure 5:
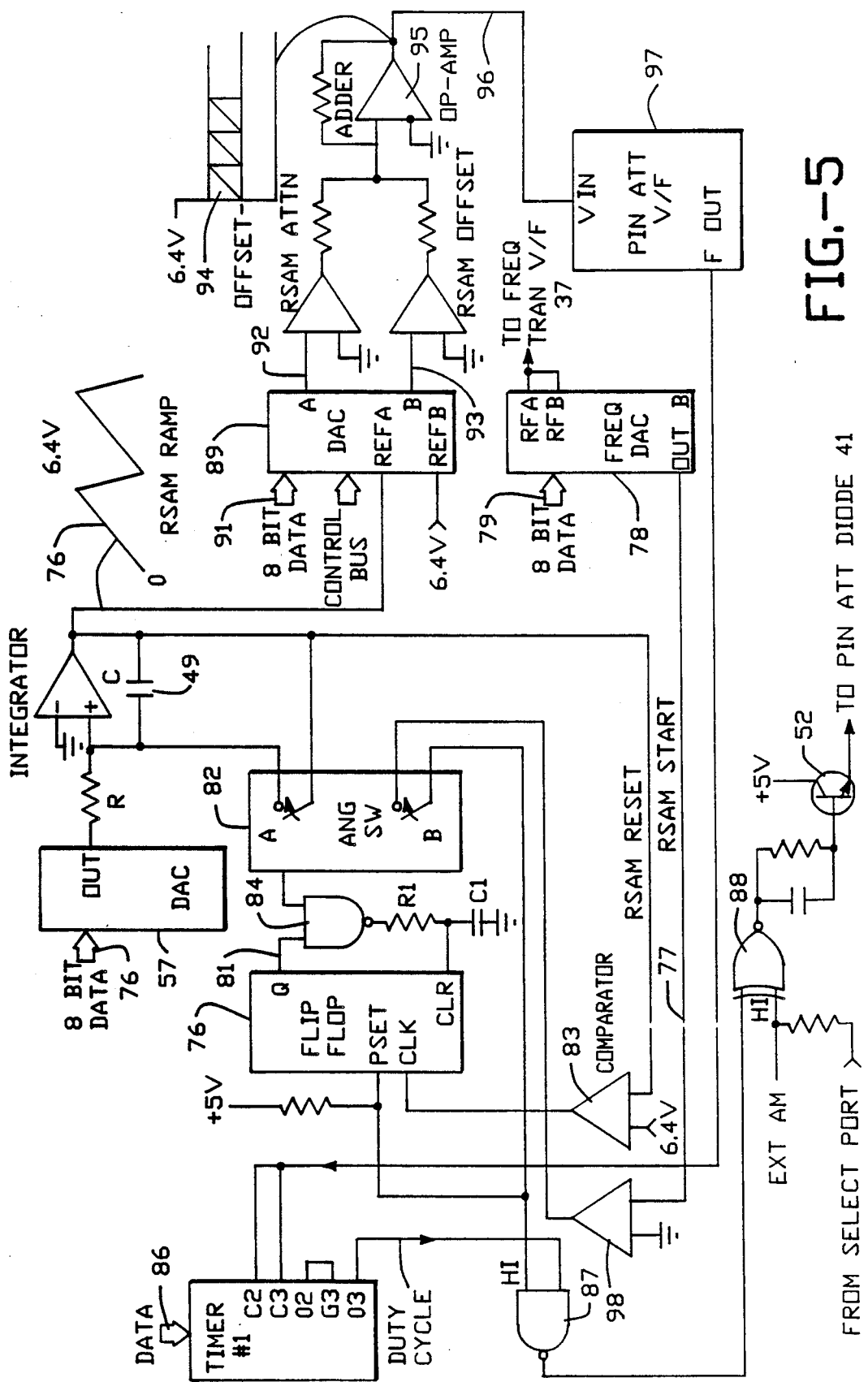
FIG. 5 is a more detailed circuit block diagram of a portion of FIG. 3 illustrating a repeater swept amplitude modulation mode.

FIG. 5 illustrates the RSAM repeater swept amplitude modulation mode. Here the same type of integrator 49 is utilized to generate the RSAM ramp voltage 76 as is true of the VGS ramp voltage. Thus the digital-to-analog converter 57 receives data on its input 76 with respect to the RSAM sweep. See FIG. 2. There is of course no provision for hold and dwell times. The ramp is reset using the RC circuit shown.

The preset input of a flip/flop 76 designated (PSET) receives a high pulse from the RSAM start line 77. This is received from a digital-to-analog converter 78 which has an 8-bit data input 79 which has the prestored start information parameter. With respect to flip/flop 76, the Q output on line 81 is low and thus the A switch of the analog switch 82 across the capacitor of integrator 49 is open. The ramp voltage at the integrator 49 starts to ramp up to 6.4 volts. Then the comparator 83 will trigger a one-shot pulse to the clock input of flip/flop 76. This will clock a high pulse at the output Q and thus close the switch A of analog switch 82 to discharge capacitor 49. Meanwhile, a low at the clear input of flip/flop 76 provided by gate 84 and its accompanying RC circuit will reset the flip/flop after a small time delay as determined by that RC circuit. After flip/flop 76 is reset, the shorting switch A opens and the RSAM start voltage on line 77 is again activated. Duty cycle is determined by the output O3 of timer #2 and the data input on line 86. This drives the gate 87 through gate 88 and the transistor switch 52 to actuate the PIN attenuating diode 41 at the predetermined duty cycle as determined by the input parameter.

The output of the integrator unit 49 is of course the RSAM ramp voltage 76. This may be adjusted for the proper offset and gain. This is accomplished by a multiplying digital-to-analog converter 89 which has as its reference input a 6.4 volt voltage and its digital input is on bus 91. By adjustment of the so-called STOP frequency the A channel which has as its output line 92 provides an effective attenuation on change of "gain" of the signal from the 6.4 volt level. The B channel on line 93 is a programmable offset control. This is illustrated in the waveform diagram 94. Adder 95 adds the offset and gain voltage to produce waveform 94.

Next, the sweep voltage on line 96 passes through a voltage-to-frequency converter 97. Nominally, the voltage-to-frequency converter is set at 51 kHz at 6.4 volts. This sweep voltage limit controls the frequency of amplitude modulation which is finally implemented in the PIN attenuating diode unit 41 (see FIG. 3). Voltage-to-frequency converter unit 97 clocks the timer unit #2 and specifically the timer inputs C2 and C3. These have been programmed by the data input 86 to give the frequency limits for that specific mode. In the RSAM mode, the frequency limit specified is, for example, 1,275 Hz. Thus the nominal frequency of 51 kHz of voltage-to-frequency converter 97 is scaled down by a division by forty by the timer #2.

The amplitude modulated signal from the output O3 of timer #2 goes through the NAND gate 87 only when the signal from the RSAM start comparator 98 goes high. At this time, of course, switch B will be closed in the analog switch 82. The output of NAND gate 87 is gated by the exclusive OR gate 87. One of the inputs of this exclusive OR gate is for external AM control. There is also a select port input control. Thus, in summary, in the RSAM mode both the frequency of translation is controlled via the digital-to-analog converter 78 and the amplitude via the PIN attenuating diode 41. All of this of course is accomplished by digital input parameters as outlined in FIG. 2.

Figure 6:
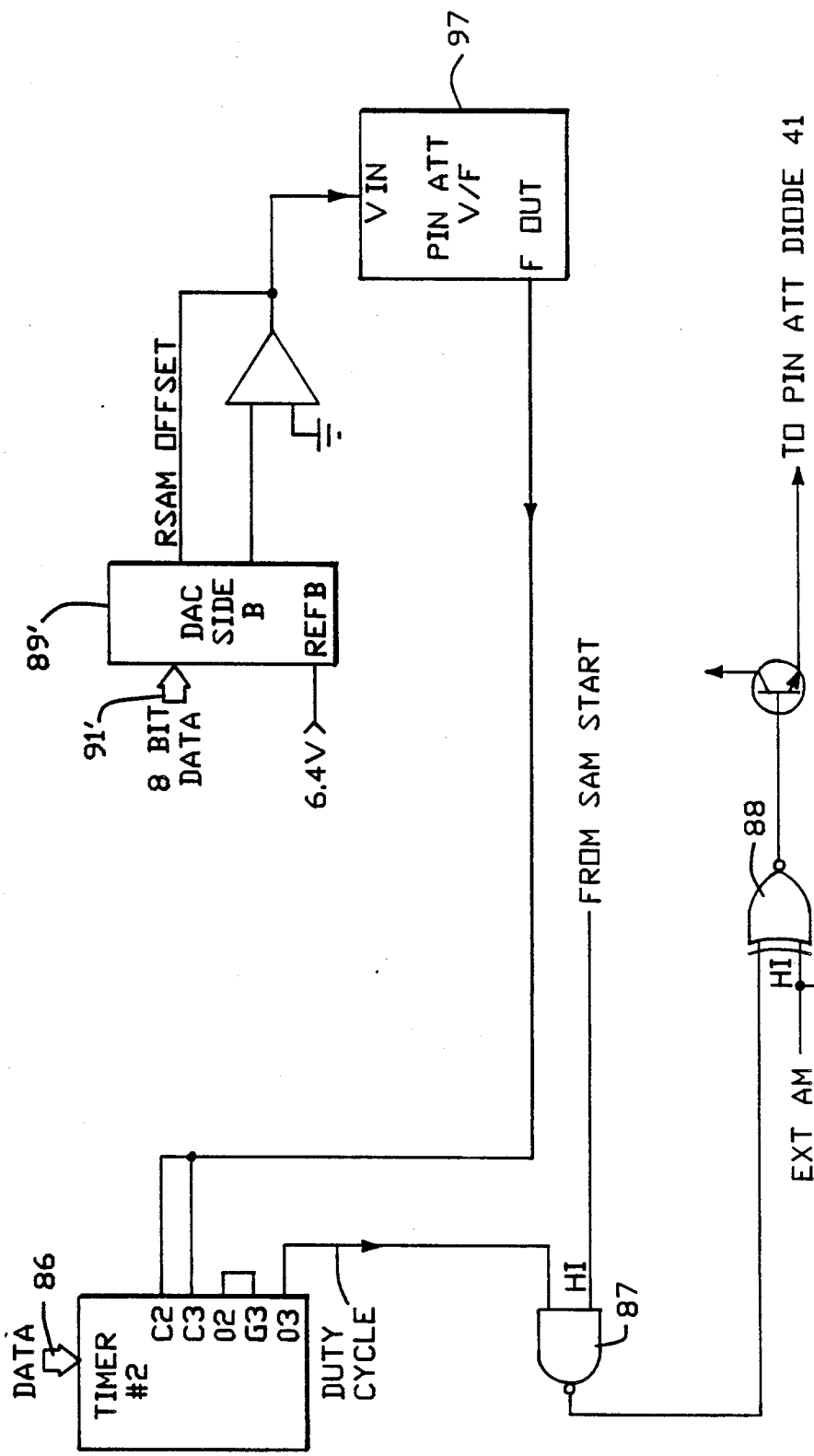
FIG. 6 is a more detailed circuit block diagram of a portion of FIG. 3 illustrating a multiple frequency repeater mode.

Referring now to FIG. 6, the MFR or multiple frequency repeater mode utilizes the same components as the RSAM but only requires the amplitude attenuation of attenuator 41 to be activated. Thus, a fixed number is sent via the 8-bit data bus 91' to the side B of the DAC 89'. This provides a fixed frequency from the output of voltage-to-frequency converter 97. In the same manner on the output line 03 of timer #2 the duty cycle is provided to PIN attenuating diode 41.

Figure 7:
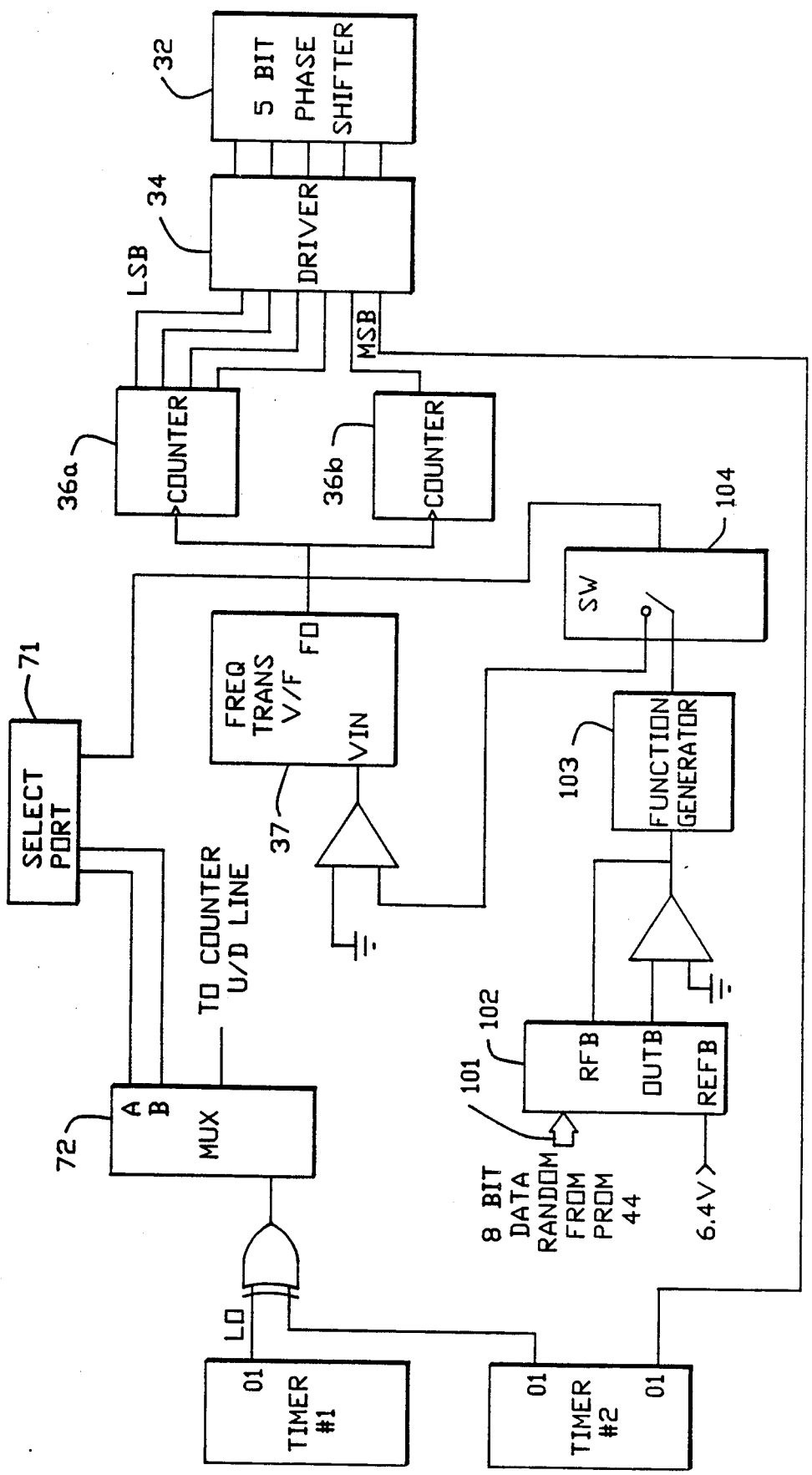
FIG. 7 is a more detailed circuit block diagram of a portion of FIG. 3 illustrating a pseudo random noise mode.

FIG. 7 illustrates the pseudo random noise mode. Basically, this drives a voltage-to-frequency converter 37 to provide a smear type frequency. Random numbers on data bus 101 are fed into the digital-to-analog converter 102 which is the same type as used for the RSAM offset. This drives a function generator chip 103 whose output is the random sawtooth frequency. This frequency is input via the switch 104 to the voltage-to-frequency converter 37 in the subsequent frequency translation circuitry. Random clock rates are provided and hence random frequency translation to provide a smearing effect on the carrier or output signal.

Figure 8:
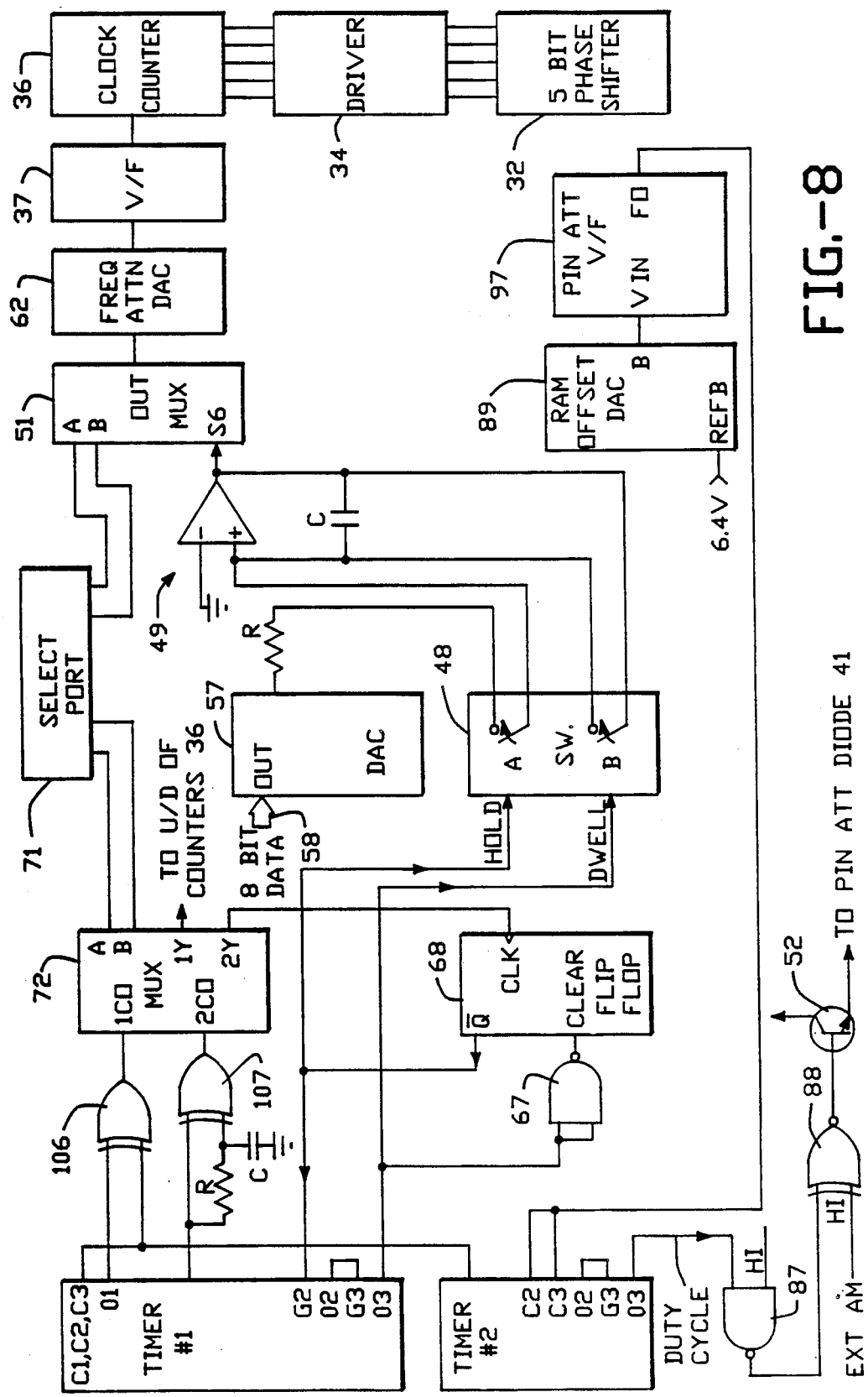
FIG. 8 is a more detailed circuit block diagram of a portion of FIG. 3 illustrating a narrow-band repeater noise mode.

FIG. 8 illustrates the narrow band repeater noise (NBRN) mode. Here, as illustrated in FIG. 2, the only input is maximum frequency translation which is input to the walk digital-to-analog converter 57 and data input 58. In general, in this mode there is a frequency translation on both sides of the received radar signal and in addition an amplitude modulation. As is apparent from examination of FIG. 8, many of the same functions with respect to the PIN attenuation diode 41 are implemented including the duty cycle output O3 from timer #2. In addition, the hold and dwell input to switch 48 from the timer #1 are operated in a similar manner as the VGS mode as illustrated in FIG. 4.

Referring specifically to the NBRN function, the timer #2 provides an output pulse of 500 Hz which clocks three timers C1, C2, C3 in timer #1. As the NBRN mode is initiated, timer O1 of timer #1 starts counting. At the end of 50 milliseconds, the RC network of exclusive OR gate 107 gives a 1 millisecond pulse which through the multiplexer 72 clocks flip/flop 68. Q1 of flip/flop 68 goes low, initiating the entire process of hold and dwell as discussed more fully in conjunction with FIG. 4. However, for the NBRN function, the hold and dwell time periods are held to a minimum.

The output 1Y of multiplexer 72 which goes to the up/down inputs of counters 36 changes state every millisecond. The 50 millisecond pulse from timer #1 inverts the pulse train at the end of 50 milliseconds. Thus this provides the function of providing frequency translations on alternate sides of the input radar signal.

From an attenuation standpoint, the digital-to-analog converter 89 provides a duty cycle on line O3 of timer #2 in the same manner as FIG. 5.

Figure 9:
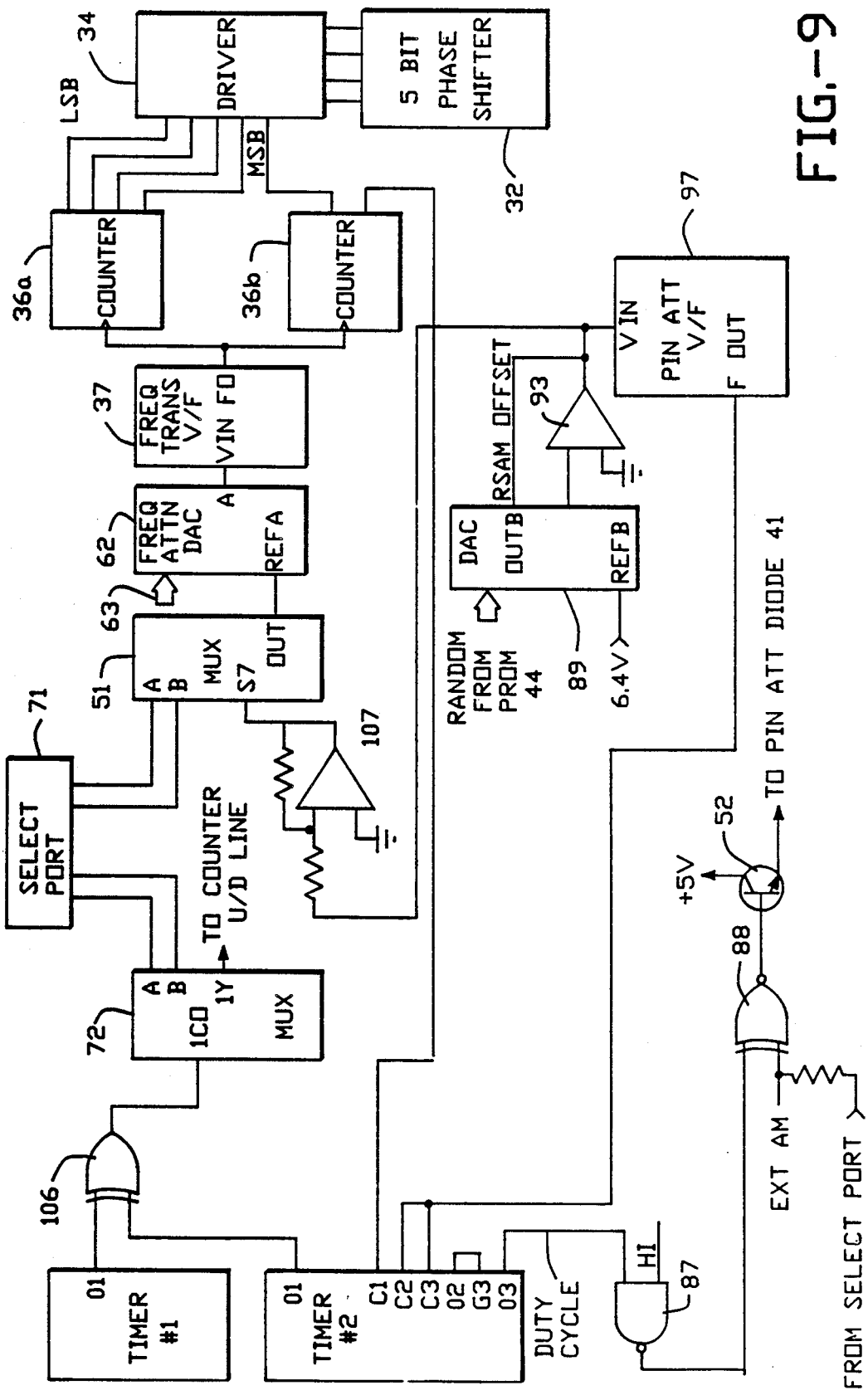
FIG. 9 is a more detailed circuit block diagram of a portion of FIG. 3 illustrating a random Doppler mode.

FIG. 9 illustrates the random Doppler mode where random numbers from EPROM 44 are sent to a RSAM offset digital-to-analog converter 89. In addition to driving, via the amplifier 93, the voltage-to-frequency converter 97 in a manner similar to the other modes, to control the amplitude of modulation by means of PIN attenuating diode 41, the output of DAC 89 also drives the frequency translating voltage-to-frequency converter 37.

More specifically, the output of DAC 89 is attenuated to the required maximum deviation by OP AMP 107 and then the multiplexer 51 drives the multiplying digital-to-analog converter 62. The digital input 63 provides for the desired scaling factor and is fed to voltage-to-frequency converter 37. This gives random frequencies and hence random maximum deviations of the carrier. Thus an improved velocity deception apparatus has been provided.

We claim:

1. Velocity deception apparatus for receiving radar signals and frequency translating them comprising:
    variable phase shifter means responsive to a ramp type voltage input for frequency translating said received radar signal and providing an output translated radar signal;
    waveform generator means for generating a plurality of different ramp type voltages;
    microprocessor means for providing at least one digital data input;
    a multiplying digital-to-analog converter having as a reference input ramp type voltages generated by said waveform generator means and having as a digital input said digital data input of said microprocessor means, said digital value of said digital data input scaling said ramp type voltage, said digital-to-analog converter having a scaled analog output for coupling to said ramp type input of said variable phase shifter means, whereby said digital data input determines the maximum of said frequency translation of said output radar signal.

2. Velocity deception apparatus as in claim 1 where said ramp type voltage generated by said waveform generator means includes walk and dwell times, said termination of said walk time being said maximum frequency translation.

3. Velocity deception apparatus as in claim 1 where said waveform generator means includes an integrating network and a charging current source, and in addition switching means for connecting said source to said integrating network and also including timer means programmed by a digital data input from said microprocessor means for opening and closing said switching means whereby with said switching means in an open condition a voltage output of said integrating network is held constant and whereby a hold time for said ramp type voltages is provided.

4. Apparatus as in claim 3 where said integrating network includes a storage capacitor together with switching means connected across said capacitor and including timer means programmed by a said digital data input from said microprocessor means for opening and closing said switching means whereby a dwell time is provided when said switching means shorts said capacitor.

5. Apparatus as in claim 1 including attenuation means connected to said phase shifter means for controllably attenuating said output radar signal in response to a digital input; timer means for providing a periodic said digital input, said timer means being coupled to said microprocessor means, said microprocessor means programming said periodic output of said timer means.

6. Apparatus as in claim 5 where said timer means is programmed for both a repeater swept amplitude modulation mode (RSAM) and a multiple frequency repeater mode (MFR) to provide a variable duty cycle from 10% to 90%.

7. Apparatus as in claim 1 including a non-volatile random access memory connected to said microprocessor means for storing parameters of said digital data inputs.

8. Apparatus as in claim 1 where said microprocessor means is programmable by a disconnectible and remote data entry means for several different modes of velocity deception operation, and including remote control means connected to a bus of said microprocessor means for selectively actuating any one of said modes.

* * * * *